United States Patent [19]

Stanley

[11] 3,720,515

[45] March 13, 1973

[54] MICROELECTRONIC CIRCUIT PRODUCTION

[75] Inventor: Charles C. Stanley, Canoga Park, Calif.

[73] Assignee: TRW Inc., Redondo Beach, Calif.

[22] Filed: Oct. 20, 1971

[21] Appl. No.: 190,834

Related U.S. Application Data

[62] Division of Ser. No. 3,435, Jan. 16, 1970.

[52] U.S. Cl.....................96/38.4, 96/36.2, 96/94 BF, 96/61 R

[51] Int. Cl.............................G03c 5/00, G03c 11/00

[58] Field of Search........96/38.4, 94 BF, 61 R, 38.3, 96/36.2; 117/34, 106 R

[56] References Cited

UNITED STATES PATENTS

| | | | |
|---|---|---|---|
| 3,219,448 | 11/1965 | LuValle et al. | 96/94 BF |
| 3,219,451 | 11/1965 | LuValle et al. | 96/94 BF |
| 3,020,156 | 2/1962 | Rowe | 96/38.4 X |
| 3,033,765 | 5/1962 | King et al. | 96/38.4 X |
| 3,464,822 | 9/1969 | Blake | 96/38.4 |
| 3,222,173 | 12/1965 | Belko et al. | 96/38.4 X |

*Primary Examiner*—David Klein
*Attorney*—Daniel T. Anderson et al.

[57] ABSTRACT

Microelectronic circuits are produced by evaporating a photosensitive compound such as a silver halide onto a chip which is then exposed to radiation such as light, or an electron beam whose motion may be controlled by a computer or similar device. The chip is then developed leaving behind the metallic conductive circuit, and the undeveloped portion is removed preferably by heating.

6 Claims, 3 Drawing Figures

Fig. I

Figure 1:
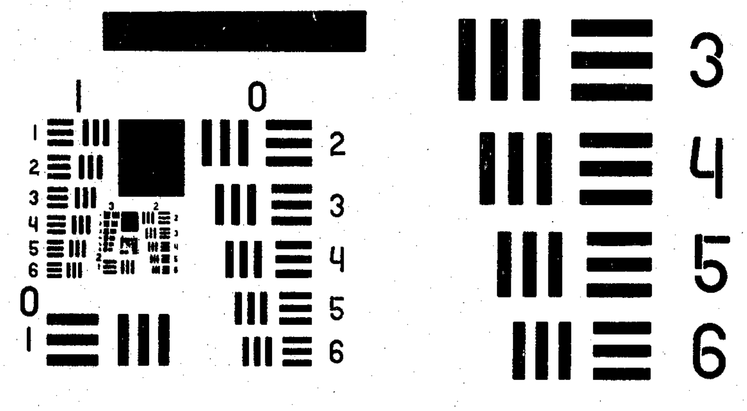

Charles C. Stanley
INVENTOR.

BY

AGENT

Charles C. Stanley
INVENTOR.
BY
AGENT

MICROELECTRONIC CIRCUIT PRODUCTION

This application is a Division of application Ser. No. 3435 filed Jan. 16, 1970.

BACKGROUND OF THE INVENTION

This invention relates to a process for producing microelectronic circuits and more specifically to employing radiation such as light, or by direct contact with an electron beam which may be controlled by a computer for exposing a circuit configuration on a substrate coated with a silver halide. Suitable treatment of the substrate will then produce the circuit.

The process of manufacturing passive elements for microelectronic circuits is essentially a photographic process and is quite complicated. It requires an accurate drawing on a large scale of the circuit in question and a subsequent reduction of this drawing to form a master negative; this is then employed to produce the circuit on a photosensitized substrate.

There are numerous problems associated with the present technology. These include the lack of uniformity in the lines of the drawing, a possibility of contamination by dirt, dust, etc., which can ruin a master negative, and the sheer time it requires to produce the drawing itself. Also, present processes lack good resolution when reducing the drawing. Resolution is affected by a host of factors which include principally: spurious reflections, non-uniform illumination, camera focus, camera movement and initial drawing definition. Drawing accuracy itself involves about 3 percent error. In practice, resolutions of 1 to 2 microns are the best obtainable.

In addition, there is an alignment problem associated with projecting the master negative onto the substrate. This results from the usual production technique of first projecting short lead connections onto the substrate followed by projecting the image of the passive element itself onto the substrate to complete the connections. Consequently, a passive element image must not only be projected accurately in flat register but also it must be projected accurately in rotational register; otherwise the leads will not be connected to the passive elements. To insure proper registry, a split-field microscope is used and this is laborious and time consuming.

Once the master negative has been produced, additional problems are still posed because it is fragile and wears out after extended use. For a long production run, additional master negatives are required and they are expensive to reproduce from a large to a small scale using an optical system. Also, a master negative, once produced, represents a final circuit design; it can be altered only by laborious microscopic techniques.

Very high energy electron beams have been used to melt, machine, vaporize, etch, or in similar fashion produce the desired pattern directly on a metal film or foil without employing a photo developing process. However, this technique suffers from problems such as redeposition of material from the vapor state and the formation of molten drops of the metal. Also, the process is time consuming.

With these drawbacks in mind, it is an object of the invention to provide a process for producing microelectronic circuits which eliminates the cumbersome master negative photographic process and produces a high resolution image.

Another object is to provide a process for producing microelectronic circuits in which the edges of the passive elements (e.g., resistors, capacitors and conductors) are significantly more uniform than those produced by photographic techniques.

Another object is to provide a rapid process for producing microelectronic circuits directly onto a substrate chip.

Other objects of the invention will become apparent from the description to follow.

In the process of this invention, a photosensitive coating is applied by evaporation onto a suitable substrate chip; the coating is exposed to radiation in the desired circuit configuration; the coating is then developed to produce the metallic circuit configuration and the undeveloped portion may be removed by chemical or evaporation techniques; alternately the undeveloped portion may be stabilized.

In a preferred embodiment, a layer of photosensitive silver halide such as a layer of AgCl, AgBr, AgI or mixtures thereof, about 1,000 – 3,000 A. thick, is applied to a chip by vapor deposition, the process taking place in a vacuum. The silver halide layer on the chip is then exposed to radiation such as an electron beam, U.V. light, etc. When employing an electron beam, its motion may be controlled through its deflection plates by a computer, wave former, or circuit actuated by a mechanical oscillator, etc. in the desired circuit configuration. Alternately the electron beam can be maintained stationary and the chip is mechanically actuated across the stationary beam to produce the desired configuration. The chip is then chemically treated to produce a silver image, and finally, the undeveloped AgCl is removed by high temperature evaporation at about 400° – 500° C leaving behind the metallic silver circuit.

The above process can thus be used to rapidly produce a circuit directly on a chip with a resolution of 250 – 300 lines per millimeter being routine.

Suitable materials for substrate chips are well known and include ceramics, glass and single crystals.

When employing a silver halide layer, the thickness is critical and must be between about 1,000 – 3,000 A. If the layer thickness is below about 1,000 A., the silver halide deposition becomes discontinuous, while a thickness in excess of about 3,000 A. produces an alteration in size and grain structure which impairs its resolution and development properties. When using other photosensitive materials, critical layer thicknesses in the same order of magnitude are necessary; these thicknesses can be readily determined. Suitable grain structures are close-packed (i.e., no voids), contiguous (this excludes overlapping, interlocking, etc.), platelets, varying in size from about 0.1 – 1.75 microns.

When evaporating photosensitive materials onto a substrate, it has been determined from electron microscope pictures that maximum resolution of an image will be obtained in the substrate or chip temperature is between about +20° C to above about −60° C.

It may be possible to evaporate the photosensitive compound onto the chip at a temperature outside the range of 20° to −60° C, followed by heating and then shock chilling into the 20° to −60° C range to obtain the desired crystal size and habit; however this would be a complicated procedure.

In addition to the silver halides, the following compounds are photoconductors capable of producing image forming reactions when light activated: antimony pentoxide, barium titanate, beryllium oxide, bismuth trioxide, boron nitride, cadmium sulfide, ceric oxide, chromium sesquioxide, germanium, indium sesquioxide, krypto cyanine, lead oxide, mica, molybdenum trioxide, stannic oxide, stannic sulfide, tantalum pentoxide, tellurium dioxide, tungsten trioxide, zinc oxide, zinc sulfide, zirconium dioxide.

The following compounds illustrate some image forming reactions which occur with activated photoconductors:

1.
$Cu^{2+} + e^- \rightarrow Cu^+$
$Cu^+ + e^- \rightarrow Cu^\circ$
2. $Pd^{2+} + 2e^- \rightarrow Pd^\circ$
3. $AuCl_4^- + 4e^- \rightarrow Au^\circ + 4Cl^-$
4. $Hg_2^{+2} + 4e^- \rightarrow 2Hg^\circ$ The wide variety of photoconductors, image sensitive developing media, and substrates obtainable from the final image forming reactions obviously leads to a wide choice of materials for circuits. Some of the above mentioned photoconductors will have certain common characteristics arising from the fact that the image material is introduced during the development of the image rather than being present during exposure as in the case of an AgX system. One of the most important properties compared to silver halides is that the primary light activation process is completely reversible; this can be seen from the general reaction:

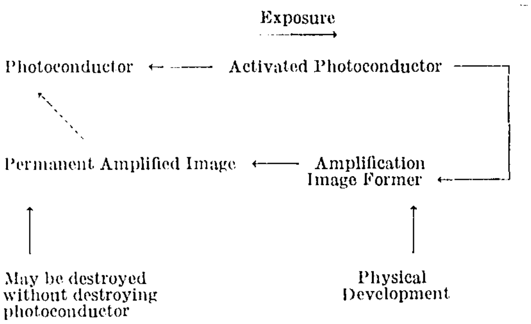

Some inherent properties of the photoconductors which are associated with microcircuit technique especially in production situations include:

Excellent stability;

Operations need not be carried out in the absence of actinic light;

Control over rates of the reversible reaction allows modification of latent image and/or erasure and corrections;

More than one kind of metal circuit may be applied using the same image sensor layer;

Processing rates are rapid because all reactants are water soluble;

Processing rates are less temperature sensitive;

Optical properties of the sensor are independent of image material constraints;

No requirement to remove unused image sensor;

Prior processing does not preclude future processing; this means that circuit parts can be added or removed and repairs can be made at this time;

Introduction of image material during processing and after exposure requires an additional processing step and one that normally requires careful control; and The reversible initial step requires immediate processing to avoid fading of the image.

Although an electron beam has been described, a laser beam, visible light such as white light, ultra-violet light, infrared light, radioactive decay particles, x-rays, or other forms of radiation may be employed provided they have sufficient energy and low scattering properties. If an electron beam is employed, its energy should be from about 5 to about 15KV. If the beam energy is too high, it will tend to scatter, while too low an energy beam will produce an underdeveloped substrate.

Figure 2:
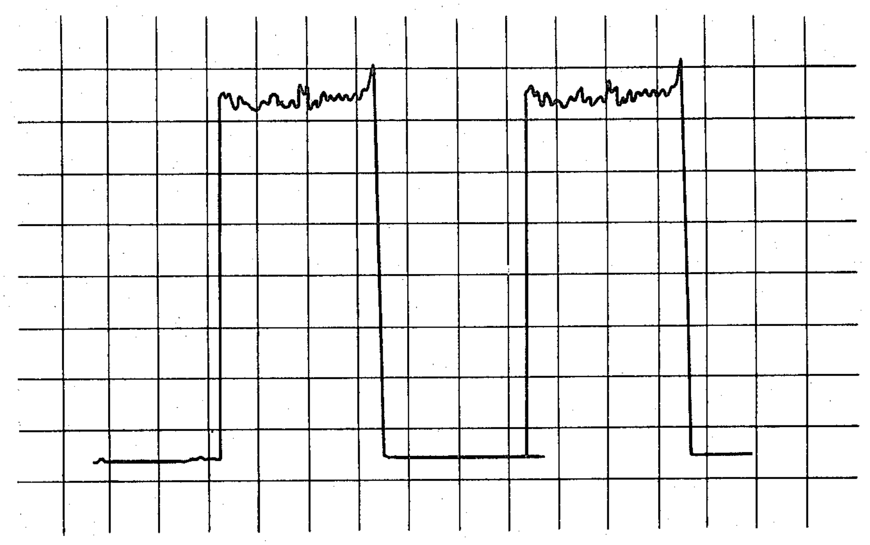

In the drawings:

FIG. 1 is a portion of a high resolution test target produced by the process of this invention; and FIG. 2 is a graph showing a microdensitometer reading across a typical line of FIG. 1.

The following example illustrates the process of the invention.

EXAMPLE

A 1,500 A. layer of AgBr is evaporated onto a glass substrate in a vacuum at $10^{-4}$ mm Hg. The substrate temperature was 20° C. The layer thickness was determined by interferometry techniques. A photomicrograph of the AgBr crystal structure at a magnification of 30,000 obtained crystals which were close packed (i.e., no voids), contiguous (this excludes overlapping, interlocking, etc.), platelets, varying in size from about 0.1 – 1.75 microns. This type of close-packed, contiguous, small grain structure is necessary to produce a suitable exposure when using photosensitive materials including silver halide. The AgBr layer has an ASA 1 sensitivity.

To evaluate its resolution capability, the AgBr layer is then exposed to U.V. light of 3,650 A. through a high resolution master target to expose a pattern of lines. The exposed AgBr layer is then developed to a line pattern in silver. The unexposed AgBr is then evaporated by heating at 500° C leaving behind the line pattern in silver as shown in FIG. 1. These are the standard line patterns employed to evaluate the resolution capability of a particular process in the photographic field.

The master target used in this example was manufactured by The Ealing Corporation as Standard No. 22–963/22864 and contains three groups of fifteen-bar contrast targets. The spatial frequency ratio between successive target is $\sqrt[10]{10}$. The target of highest spatial frequency in each group is repeated as the target of lowest spatial frequency in the next group, making a total of 31 distinct target frequencies. The maximum variation in width between light and dark bars is less than 5 percent over the 1 to 300 cycles/mm range. The density difference is greater than 2.0. The spatial frequencies in each group in cycles per millimeter are as follows:

| GROUP I | GROUP II | GROUP III |
|---|---|---|
| 1.00 | 10.00 | 100.0 |
| 1.26 | 12.59 | 125.9 |
| 1.58 | 15.85 | 158.5 |
| 2.00 | 19.96 | 199.6 |
| 2.51 | 25.12 | 251.2 |
| 3.16 | 31.63 | 316.3 |
| 3.98 | 39.82 | 398.2 |
| 5.01 | 50.14 | 501.4 |
| 6.31 | 63.13 | 631.3 |
| 7.95 | 79.48 | 794.8 |
| 10.00 | 100.00 | 1000.0 |

The Ealing test target is equivalent to the U.S. Air Force Resolution Standard, and would rate the line pattern of FIG. 1 as superior to excellent compared to the images from master negatives prepared by photographic techniques that are used to produce microelectronic circuits.

The edge definition of the line pattern in FIG. 1 is determined using a microdensitometer method and its evaluation is shown in FIG. 2. Briefly, the evaluation consists in passing a light beam across the series of bars in FIG. 1 and measuring the light transmittance during the passage of the beam. A Joyce Loebel Model C micro densitometer was employed using an optical mangification of 10, slit size of 3 microns and scan ratio of 50 to 1. It will be observed from FIG. 2 that the edge definition appears virtually as a square wave. This means that when the light beam strikes the leading edge of a line, its absorption is instantaneous and when the light beam moves away from the line, the light transmittance instantaneously becomes total. This can be ascertained by examining the vertical portions of the square wave. In short, the optical density of the line edges is uniform. The upper irregular portion of the curve represents fluctuations of the grain structure. It will be noted that these fluctuations are confined to a very narrow band and there are no significant decay areas which would indicate an imperfect AgBr deposition.

It will be observed that the present invention eliminates the necessity of using a binder associated with the silver halide layer when exposing with an electron beam. Use of a binder requires an increase of electron beam energy because of emulsion absorption which tends to burn the binder and this, of course, is unsatisfactory because it interferes with circuit uniformity.

What is claimed is:

1. A process for producing a microelectronic circuit on a substrate chip which comprises:

evaporating a binderless photosensitive metallic-forming compound onto said chip to a thickness sufficient to become entirely exposed when subjected to radiation;

the photosensitive compound being in the form of close-packed, contiguous platelets in the size range of from about 0.1 – 1.75 microns;

exposing said compound to radiation in the configuration of the desired circuit;

developing said compound to produce the circuit in metal; and removing the undeveloped compound by evaporation at high temperature.

2. A process for producing a microelectronic circuit on a substrate chip which comprises:

evaporating a binderless photosensitive silver halide compound onto said chip to a thickness of about 1,000 – 3,000 A. in the form of close-packed, contiguous platelets, in the size range of about 0.1 – 1.75 microns;

exposing said compound to radiation in the configuration of the desired circuit;

developing said exposed compound to produce the circuit in metallic silver; and removing the undeveloped portion by evaporation at high temperature.

3. A process for producing a microelectronic circuit on a substrate chip which comprises:

evaporating a binderless photosensitive metallic-forming compound onto said chip at a chip temperature of less than about 20° C and greater than about −60° C;

to a thickness of about 1,000 – 3,000 A.;

exposing said compound with radiation in the configuration of the desired circuit;

developing said compound to produce the circuit in metallic form; and removing the undeveloped compound by evaporation at high temperature.

4. The method of claim 3 in which the photosensitive compound is a silver halide.

5. A process for producing a microelectronic circuit on a substrate chip which comprises:

evaporating a binderless photosensitive silver halide onto said chip;

at a chip temperature of less than about 20° C and greater than about −60° C;

to a thickness of about 1,000 – 3,000 A.;

in the form of close-packed, contiguous platelets varying in size from about 0.1 – 1.75 microns;

exposing said silver halide to radiation in the configuration of the desired circuit;

developing said silver halide to produce the circuit in metallic silver; and removing the undeveloped compound by evaporation at high temperature;

6. A process for producing a microelectronic circuit on a substrate chip which comprises:

evaporating a binderless photosensitive silver halide selected from the class consisting of AgCl and AgBr onto said chip;

at a chip temperature of less than about 20° C and greater than about −60° C;

to a thickness of about 1,000 – 3,000 A.;

in the form of close-packed, contiguous platelets varying in size from about 0.1 – 1.75 microns;

exposing said silver halide to radiation in the configuration of the desired circuit;

developing said silver halide to produce the circuit in metallic silver; and removing the undeveloped compound by evaporation at high temperature.

* * * * *